United States Patent

Karklys

[15] 3,639,844
[45] Feb. 1, 1972

[54] ELECTRONIC TIMER FOR A MULTIPLE FUNCTION APPLIANCE

[72] Inventor: Joseph Karklys, St. Joseph, Mich.
[73] Assignee: Whirlpool Corporation
[22] Filed: June 27, 1969
[21] Appl. No.: 837,179

[52] U.S. Cl. .............................. 328/130, 134/57 D, 259/1, 307/225, 307/293, 340/309.1
[51] Int. Cl. ..................................... G01r 29/02, H03k 5/00
[58] Field of Search............ 307/141, 141.4, 141.8, 220–226, 307/261, 269, 293; 328/129–131, 39, 41–49; 317/141, 142; 340/309.1, 309.4; 34/43, 44, 53; 134/57 D, 58 D; 222/70; 259/1

[56] References Cited

UNITED STATES PATENTS

| | | | |
|---|---|---|---|
| 2,970,226 | 1/1961 | Skelton et al. .......................... 307/293 |
| 3,376,546 | 4/1968 | Cress, Jr. et al. ....................... 328/48 X |
| 3,378,703 | 4/1968 | Huxster et al. .......................... 307/293 |
| 3,383,525 | 5/1968 | Arksey .................................. 328/129 X |
| 3,464,673 | 9/1969 | Cargo et al. ........................ 134/57 D X |
| 3,539,153 | 11/1970 | Wennerberg et al. ............. 134/57 D X |

Primary Examiner—Stanley D. Miller, Jr.
Attorney—James S. Nettleton, Thomas E. Turcotte, Gene A. Heth, Burton H. Baker, Donald W. Thomas, Frank C. Harter and Hofgren, Wegner, Allen, Stellman & McCord

[57] ABSTRACT

An electronic timer for a multiple function appliance, having a source of alternating reference signal connected with a divider which provides a signal at a submultiple of the reference signal frequency. A series of J–K flip-flops forms a counter which establishes plural timing periods. On termination of a function of the appliance, the counter is automatically reset.

14 Claims, 2 Drawing Figures

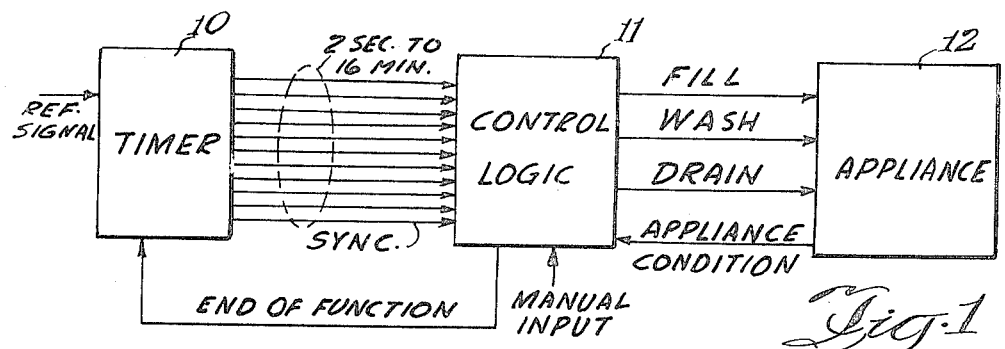
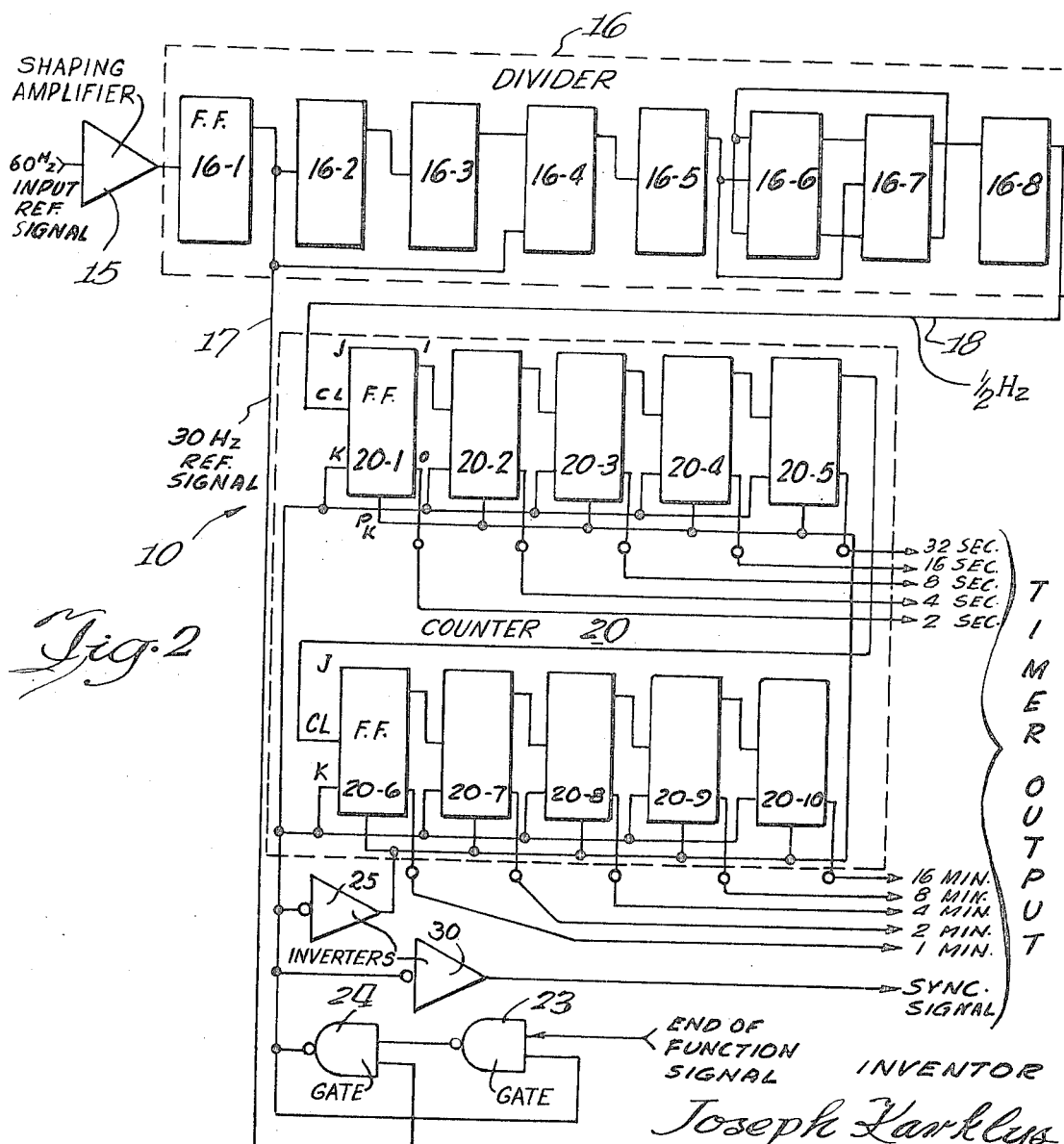

ELECTRONIC TIMER FOR A MULTIPLE FUNCTION APPLIANCE

FIELD OF THE INVENTION

This invention relates to an electronic timer which is particularly adapted for controlling operation of a multiple function appliance such as a dishwasher, laundering machine, etc.

THE PRIOR ART

In controlling appliances having plural timing periods, in order to establish the time of operation of various functions, it is common to utilize a motor driven timer cam which operates switches to start and stop the functions. In my copending application, Ser. No. 837,163 filed June 27, 1969 and assigned to the assignee of this application, there is shown in detail an electronic appliance control utilizing programmed logic circuitry, which may be utilized in lieu of such a cam switch control. The present application is concerned with an electronic timer particularly suited for use with a control of the character described in said application.

SUMMARY OF THE INVENTION

In accordance with the present invention, a divider operating from the line frequency provides signals at submultiples of the line frequency. These signals are connected with a counter having plural outputs for timing periods of various lengths and which is reset at the end of each function of the appliance.

One feature of the invention is that the control is arranged to cause the resetting of the counter circuits to be synchronized with the reference signal.

A further feature is that the reset signal is generated upon termination of an appliance function, whether the function was timed or terminated in accordance with a condition of the appliance.

Another feature is that the counter utilizes multiple stages of conventional binary elements to obtain the desired low-frequency pulses for controlling the appliance operation. In one embodiment a plurality of J-K flip-flops, each having K and $P_K$ inputs, for example, Signetics Corporation, Sunnyvale, California, J-K flip-flops, Model SP620A, were utilized in conjunction with counter resetting means including circuitry for applying reset signals to these inputs.

Still a further feature is that the reset signal is generated by a pair of serially connected, two input NAND gates.

Another feature is that an appliance function control signal is derived from the counter reset means.

BRIEF DESCRIPTION OF THE DRAWINGS

Further features and advantages of the invention will readily be apparent from the following description and from the drawings, in which:

FIG. 1 is a block diagram of a timer control and appliance incorporating the invention; and FIG. 2 is a block diagram of the timer.

DESCRIPTION OF THE PREFERRED EMBODIMENT

In a multiple function appliance, as a dishwasher 12, an operating sequence may include the following functions:

Fill
Rinse
Drain
Fill
Wash
Drain
Fill
Rinse
Drain
Dry

Some of the functions, as wash and rinse, have a specific time duration. Other functions, as fill or dry, are terminated in accordance with a condition of the appliance, i.e., water level and temperature. The timer 10 disclosed herein provides for operation with both types of appliance function.

In FIG. 1, the timer 10 is connected with a control logic 11 of the appliance 12. The outputs of the timer include a synchronizing signal, or sync pulse, and plural time period signals indicated in the diagram as 2-SEC, 4-SEC, 8-SEC, etc. Obviously other time periods, either shorter or longer, might be provided depending on the requirements of the particular appliance. The control logic 11 determines the function of the appliance 12 to be performed in accordance with a preset program and appropriate commands, as "fill," "wash," or "drain," are given to the appliance. Upon termination of a timed function, the circuitry of control logic 11 generates an "end of function" signal which is connected with timer 10. If the particular function is terminated only in accordance with an appliance condition, a signal indicating such condition is connected from the appliance 12 to the control logic 11, as shown, again resulting in the generation by control logic 11 of an "end of function" signal.

The preset program of the control logic 11 may be modified by a manual input.

Further details of the control logic and its interconnection with the appliance may be found in my application identified above.

A preferred embodiment of the timer 10 is illustrated in FIG. 2. As shown, timer 10 is controlled by an alternating signal at a suitable reference frequency. A readily available reference signal is the 60 Hz. powerline frequency from the power source utilized to operate the appliance. The 60 Hz. sine wave signal is connected with shaping amplifier 15 which has a 60 Hz. square wave output that provides the input to a divider 16 comprising serially connected J-K flip-flop stages 16-1, 16-2, etc. The operation of the divider itself forms no part of the invention; and it is sufficient for an understanding of the invention to know that two outputs are derived from the divider, one of 30 Hz. at 17 and the other of 0.5 Hz. at 18.

A counter 20 is driven by the 0.5 Hz. signal from the divider 16. Counter 20 comprises serially connected J-K flip-flops which, in the circuit shown, provide timing periods as set forth below. Each flip-flop stage is identified by the number 20 followed by the flip-flop position in the sequence, as 20-1, 20-2, etc. Listed below in tabular form are the timing periods for each flip-flop:

| Flip-Flop Stage | Timing Period |
| --- | --- |
| 20-1 | 2 sec. |
| 20-2 | 4 sec. |
| 20-3 | 8 sec. |
| 20-4 | 16 sec. |
| 20-5 | 32 sec. |
| 20-6 | 1 min. (64 sec.) |
| 20-7 | 2 min. |
| 20-8 | 4 min. |
| 20-9 | 8 min. |
| 20-10 | 16 min. |

Additional stages and interconnection of stages in other than a simple serial manner can provide other timing intervals. The approximation of 64 seconds=1 minute is sufficiently accurate for an appliance control. A more complex counter could be used to obtain a 60 second count.

The standard connection points for the illustrative J-K flip-flops are indicated on the block of first counter flip-flop 20-1. The timing outputs for the various periods are derived from the zero output connection of the appropriate flip-flops. The times of principal interest in controlling illustrative appliance 12 are indicated on the drawing.

At the end of each function of the appliance, it is necessary to reset counter 20 to zero before starting the next function. Timer 10 provides for accomplishing this resetting and for generating the sync pulse which indicates to the control logic 11 that the next function may be initiated. The sync pulse or timer output is, in effect, a command signal to control logic 11 to advance the memory elements therein to initiate the next appliance function such as "fill," "wash," or "drain."

The end of function signal from control logic 11 is connected with one of the inputs of a NAND-gate 23. The output of this NAND-gate is connected with one of the inputs of a second NAND-gate 24, the output of which provides the reset signal to the counter. The second input of NAND-gate 24 is a 30 Hz. reference signal from the output 17 of divider 16. As will appear, the resetting of the counter is thus synchronized with the reference signal so that the succeeding count is properly initiated. The second input of the first NAND-gate 23 is obtained from the output of second NAND-gate 24.

The reset signal is generated in the following manner. During the counting operation, before the function period is completed, the "end of function" input of NAND-gate 23 is at a high potential. The output of second NAND-gate 24 is also at a high potential. Thus, the output of first NAND-gate 23 is at a low potential and the output of NAND-gate 24 remains high even though the second input thereto is changing between high and low at a 30 Hz. rate. When the function is terminated, either by expiration of a timing period or in accordance with an appliance condition, the end of function input of NAND-gate 23 goes low and the output of NAND-gate 23 goes high. On the next occurrence of a high input from the 30 Hz. output 17 of the divider, the output of NAND-gate 24 goes low, generating the reset signal. This 30 Hz. pulse, from high level to low level, is applied directly to the K input terminals of each of the counter flip-flops, 20–1 through 20–10 thus resetting the counter stages for establishing time periods within two seconds accuracy. It will be recognized that, if desired, even greater accuracy could be obtained by resetting flip-flop stages 16–1 through 16–8. In appliance operation the illustrated arrangement has given good results. An inverter 25 has its input connected with the output of NAND-gate 24 and generates a positive going reset signal which is applied to the $P_K$ inputs of each of the flip-flops 20–1 through 20–10. All flip-flops 20–1 through 20–10 are thus reset and remain in this condition until the respective timing periods have again expired.

Another inverter 30 has its input connected with the output of NAND-gate 24 and, on generation of the reset signal by gate 24, generates the sync pulse which changes the state of the memory elements of control logic circuitry 11 to initiate the next appliance function.

At the end of the 30 Hz. pulse, the output of NAND-gate 24 goes high. In the meantime, the end of function signal from control logic 11 is terminated, the input returning to a high level and the output to a low level. The output of NAND-gate 24 returns to a high level until the end of the next function period.

The timer or clock of the present invention has the capability of generating high accuracy clock timing periods without any adverse temperature variation effects such as are inherent with known RC timing circuits wherein exposure of the components to varying ambient temperature conditions will, of necessity, introduce errors in the generated timing periods. Thus, the timer of the present invention has the ability to operate over a relatively wide temperature range such as may be found in a home appliance such as a dishwasher or clothes dryer, for example, while providing the desired accuracy of the timing periods.

The timer of the present invention provides desired timing periods of great accuracy in multiples of 8.3 milliseconds, based on 60 Hz. line frequency power supply, and can also be readily modified to generate timing periods up to several hours in length if such relatively long timing periods are desired.

Another feature of the timer or clock of the present invention is the fact that the timing signals are generated at a rate which is directly proportional to the frequency of the signals generated by the signal source to which the timer input is connected, and thus the generated timing periods are of a duration which is inversely proportional to the frequency of the signals generated by the signal source. This feature facilitates rapid checking of an appliance control embodying the invention such as a dishwasher control, or a home laundry appliance control. If the control is designed for operation utilizing a 60 Hz. line frequency base for the signal source, the control can be disconnected from the 60 Hz. source and connected to a relatively high frequency source such as a 4kHz. signal source to quickly check for satisfactory condition of the control. The time for the control to run through the cycle at the relatively high frequency will be greatly reduced since the duration of the timing period is in inverse proportion to the frequency of the signal source.

The timer circuitry, utilizing conventional basic flip-flop circuits, NAND gates and inverting amplifiers, is particularly suited for incorporation in integrated circuitry, using well known techniques. This permits the production of small, accurate and reliable timers at a reasonable cost.

The foregoing disclosure of specific embodiments is illustrative of the broad inventive concepts comprehended by the invention.

The embodiments of the invention in which an exclusive property or privilege is claimed are defined as follows:

1. An electronic timer, comprising: a source of alternating reference signal at a reference frequency; a divider circuit connected with said source for deriving therefrom reference signals at a submultiple of said reference frequency; a counter connected with said divider to establish a plurality of different preselected timing periods; and means operative selectively on termination of a first preselected one of said different timing periods or generation of a signal externally of the timer for resetting said counter and initiating a subsequent preselected timing period in synchronization with said submultiple frequency reference signals.

2. The timer of claim 1 in which said counter has plural flip-flops each having input means, and said resetting means includes means for applying reset signals to said input means.

3. The timer of claim 2 including means for deriving a reset signal of one polarity and applying said signal to the input means of said flip-flops.

4. An electronic timer, comprising: a source of alternating reference signal at a reference frequency; a divider circuit connected with said source for deriving therefrom reference signals at a submultiple of said reference frequency; a counter connected with said divider to establish a plurality of timing periods; and means operative on termination of a timing period for resetting said counter, said means for generating the reset signal comprising a pair of serially connected, two input NAND gates, the first having one input connected with a source of signal representing termination of the timing period and its output connected with one input of the second gate, the other input of the second gate being connected with said source of reference signal and the output of said second gate being connected to provide the second input of the first gate and to reset said counter circuits.

5. An electronic timer for use with a multiple function appliance, comprising: a source of alternating reference signal at a reference frequency; a divider circuit connected with said source for deriving therefrom reference signals at a submultiple of said reference frequency; a counter connected with said divider to establish a plurality of different preselected timing periods; means operative selectively on termination of a first preselected one of said different timing periods or generation of a signal externally of the timer for resetting said counter and initiating a subsequent preselected timing period in synchronization with said submultiple frequency reference signals; and means for providing a command signal to initiate a timed operation of the appliance for said subsequent preselected timing periods.

6. The timer of claim 5 wherein the function of said appliance is terminated in accordance with a selected timing period of said counter.

7. The timer of claim 5 further including means for terminating said appliance function in accordance with a condition of the appliance.

8. The electronic timer of claim 5 including means for deriving an appliance control signal from said reset means.

9. The timer of claim 5 including means for synchronizing said resetting means with said reference signal so that the timing period for the subsequent function of said appliance may be established with accuracy to ensure a full timing period for such subsequent function of the appliance.

10. An electronic timer for use with a multiple function appliance, comprising: means providing an alternating reference signal; a counter responsive to said reference signal for establishing a plurality of different timing periods; means responsive to termination of a function of said appliance for resetting said counter; means for controlling operation of the appliance selectively as a function of said timing periods; and means for synchronizing said resetting means with said reference signal comprising a pair of serially connected, two input NAND gates, the first having one input connected with a source of signal representing termination of the timing period and its output connected with one input of the second gate, the other input of the second gate being connected with said source of reference signal and the output of said second gate being connected to provide the second input of the first gate and to reset said counter circuits.

11. The electronic timer of claim 1 for use with a multiple function appliance, wherein each of said timing periods has a duration inversely proportional to the frequency of the alternating reference signal.

12. The timer of claim 9 wherein said source of alternating reference signal includes a powerline providing a sine wave reference signal and the means for synchronizing said resetting means includes means for generating a reference signal having a frequency which is a submultiple of said sine wave reference signal which is applied to said counter.

13. An electronic timer as claimed in claim 11 wherein said timer is responsive to an end-of-function signal generated by a control logic externally of said timer upon termination of a timed function.

14. An electronic timer as claimed in claim 11 wherein said timer is responsive to an end-of-function signal generated externally of said timer by an appliance in accordance with a condition of the appliance.

* * * * *